US012756254B2

(12) United States Patent
Okuda

(10) Patent No.: US 12,756,254 B2
(45) Date of Patent: Oct. 6, 2026

(54) ROTATING ELECTRICAL MACHINE

(71) Applicant: HONDA MOTOR CO., LTD., Tokyo (JP)

(72) Inventor: Shuhei Okuda, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 177 days.

(21) Appl. No.: 18/900,905

(22) Filed: Sep. 30, 2024

(65) Prior Publication Data

US 2025/0112513 A1 Apr. 3, 2025

(30) Foreign Application Priority Data

Oct. 2, 2023 (JP) ................................ 2023-171322

(51) Int. Cl.

| | |
|---|---|
| ***H02K 3/24*** | (2006.01) |
| ***H02K 1/20*** | (2006.01) |
| ***H02K 9/00*** | (2006.01) |
| ***H02K 9/12*** | (2006.01) |

(52) U.S. Cl.

CPC ................ *H02K 3/24* (2013.01); *H02K 1/20* (2013.01)

(58) Field of Classification Search

CPC .. H02K 3/24; H02K 1/20; H02K 9/00; H02K 9/12

USPC ........................................... 310/58, 59, 201

See application file for complete search history.

(56) References Cited

U.S. PATENT DOCUMENTS

| | | | | |
|---|---|---|---|---|
| 11,716,001 | B2 | 8/2023 | Schmack et al. | |
| 2019/0363601 | A1 | 11/2019 | Kneidl et al. | |
| 2020/0153306 | A1 | 5/2020 | Uhlmann | |
| 2022/0216743 | A1 * | 7/2022 | Leonardi | H02K 1/20 |

(Continued)

FOREIGN PATENT DOCUMENTS

| | | | | |
|---|---|---|---|---|
| CH | 633390 | A5 * | 11/1982 | H02K 3/24 |
| DE | 102021213834 | A1 | 6/2023 | |
| JP | 7139969 | B2 | 9/2022 | |

(Continued)

OTHER PUBLICATIONS

Notification of Reasons for Refusal issued Aug. 26, 2025 in the JP Patent Application No. 2023-171322.

*Primary Examiner* — Jose A Gonzalez Quinones
(74) *Attorney, Agent, or Firm* — CKC & PARTNERS CO., LLC

(57) ABSTRACT

A rotating electrical machine includes: a plurality of rectangular conductors; a first coolant flow path; and a second coolant flow path. Each rectangular conductors includes a specific shape portion and normal shape portions that are different from the specific shape portion and arranged with the specific shape portion interposed therebetween, and the specific shape portion has a relatively small thickness dimension in one direction orthogonal to a longitudinal direction of the rectangular conductor, and a relatively large thickness dimension in another direction orthogonal to the longitudinal direction. The rectangular conductors are juxtaposed in the slot so that a plurality of the specific shape portions are adjacent to each other, the first coolant flow path is formed between the normal shape portions of the rectangular conductors, and the second coolant flow path is formed between an inner wall of the slot and the specific shape portions of the rectangular conductors.

3 Claims, 20 Drawing Sheets

(56) References Cited

U.S. PATENT DOCUMENTS

| | | | |
|---|---|---|---|
| 2025/0047178 | A1 | 2/2025 | Streng |

FOREIGN PATENT DOCUMENTS

| | | | | | |
|---|---|---|---|---|---|
| WO | 2022073536 | A1 | | 4/2022 | |
| WO | WO-2022188916 | A1 | * | 9/2022 | ............... H02K 3/34 |
| WO | WO-2025017963 | A1 | * | 1/2025 | ............... H02K 3/24 |

* cited by examiner

ROTATING ELECTRICAL MACHINE

This application is based on and claims the benefit of priority from Japanese Patent Application No. 2023-171322, filed on 2 Oct. 2023, the content of which is incorporated herein by reference.

BACKGROUND OF THE INVENTION

Field of the Invention

The present invention relates to a rotating electrical machine.

Related Art

A stator of a rotating electrical machine generates heat due to copper loss and iron loss. For this reason, a cooling technique in which coolant is circulated in a stator is adopted in some cases. In relation to this technique, it is proposed that conductors in slots are provided with grooves functioning as coolant flow paths and extending in the longitudinal directions of the conductors so that the coolant flowing through the grooves directly cools the conductors (Japanese Patent No. 7139969).

Patent Document 1: Japanese Patent No. 7139969

SUMMARY OF THE INVENTION

However, according to the technique disclosed in Japanese Patent No. 7139969, it is difficult to mold the conductors themselves so as to have the grooves functioning as the coolant flow paths. Even if the grooves are provided, there is a risk of a problem that circulation of the coolant around the conductors cannot necessarily be secured to an extent of improving the cooling effect.

The present invention has been made in view of the circumstances described above, and an object thereof is to provide a rotating electrical machine that is easy to manufacture and cools a stator with high efficiency.

A first aspect of the disclosure is directed to a rotating electrical machine (e.g., a rotating electrical machine 1 described later) that includes: a stator core (e.g., a stator core 6 described later) including a plurality of rectangular conductors (e.g., rectangular conductors 8 described later) arranged in a slot (e.g., a slot 7 described later); a first coolant flow path (e.g., a first coolant flow path 21*a* described later); and a second coolant flow path (e.g., a second coolant flow path 21*b* described later). Each rectangular conductor includes a specific shape portion (e.g., a specific shape portion 8S described later) and normal shape portions (e.g., normal shape portions 8N described later) that are different from the specific shape portion and arranged with the specific shape portion interposed therebetween, and the specific shape portion has a relatively small thickness dimension in one direction (e.g., one direction CW described later) orthogonal to a longitudinal direction of the rectangular conductor, and a relatively large thickness dimension in another direction (e.g., another direction EW described later) orthogonal to the longitudinal direction. The plurality of rectangular conductors are juxtaposed in the slot so that a plurality of the specific shape portions are adjacent to each other, the first coolant flow path is formed between the normal shape portions of the plurality of rectangular conductors, and the second coolant flow path is formed between an inner wall of the slot and the specific shape portions of the plurality of rectangular conductors.

According to a second aspect of the present disclosure, in the rotating electrical machine of the first aspect, the first coolant flow path is formed between the normal shape portions due to arrangement in which the specific shape portions are stacked adjacent to each other in the slot such that portions belonging to the specific shape portions and each having the relatively large thickness dimension (EW) are aligned with each other in a stacking direction.

According to a third aspect of the present disclosure, in the rotating electrical machine of the first aspect, the second coolant flow path is formed between the inner wall of the slot and the specific shape portions due to arrangement in which the specific shape portions are stacked adjacent to each other in the slot such that portions belonging to the specific shape portions and each having the relatively small thickness dimension (CW) are aligned in a stacking direction.

In the rotating electrical machine of the first aspect, the rectangular conductors are juxtaposed in the slot so that a plurality of the specific shape portions are adjacent to each other, and the first coolant flow path is formed between the normal shape portions of the plurality of rectangular conductors, and the second coolant flow path is formed between an inner wall of the slot and the specific shape portions of the plurality of rectangular conductors. Due to this feature, for example, even if insulating paper disposed between the inner wall of the slot and the straight parts of the rectangular conductors contains a foamed material, the first coolant flow paths are each ensured between the rectangular conductors adjacent to each other when the rectangular conductors are arranged in the slot, and communicate with the second coolant flow paths, which are ensured between the inner wall of the slot (including an insulating member, such as insulating paper) and the corresponding rectangular conductors. The coolant circulating through the foregoing coolant flow paths can efficiently cool the rectangular conductors while the rotating electrical machine 1 is in operation.

In the rotating electrical machine of the second aspect described above, the first coolant flow path is formed between the normal shape portions due to arrangement in which the specific shape portions are stacked adjacent to each other in the slot such that portions belonging to the specific shape portions and each having the relatively large thickness dimension are aligned with each other in a stacking direction. Due to this feature, the coolant flow paths as the first coolant flow path is ensured between the normal shape portions of the rectangular conductors. The coolant circulating through the coolant flow path facilitates cooling of the rectangular conductors.

In the rotating electrical machine of the third aspect described above, the second coolant flow path is formed between the inner wall of the slot and the specific shape portions due to arrangement in which the specific shape portions are stacked adjacent to each other in the slot such that portions belonging to the specific shape portions and each having the relatively small thickness dimension are aligned in a stacking direction. Due to this feature, the coolant flow path as the second coolant flow path is ensured between the inner wall of the slot and the specific shape portions of the rectangular conductors. The coolant flowing through the second coolant flow path smoothly flows to the first coolant flow paths, thereby facilitating cooling of the entire rectangular conductors.

DETAILED DESCRIPTION OF THE INVENTION

Figure 1:
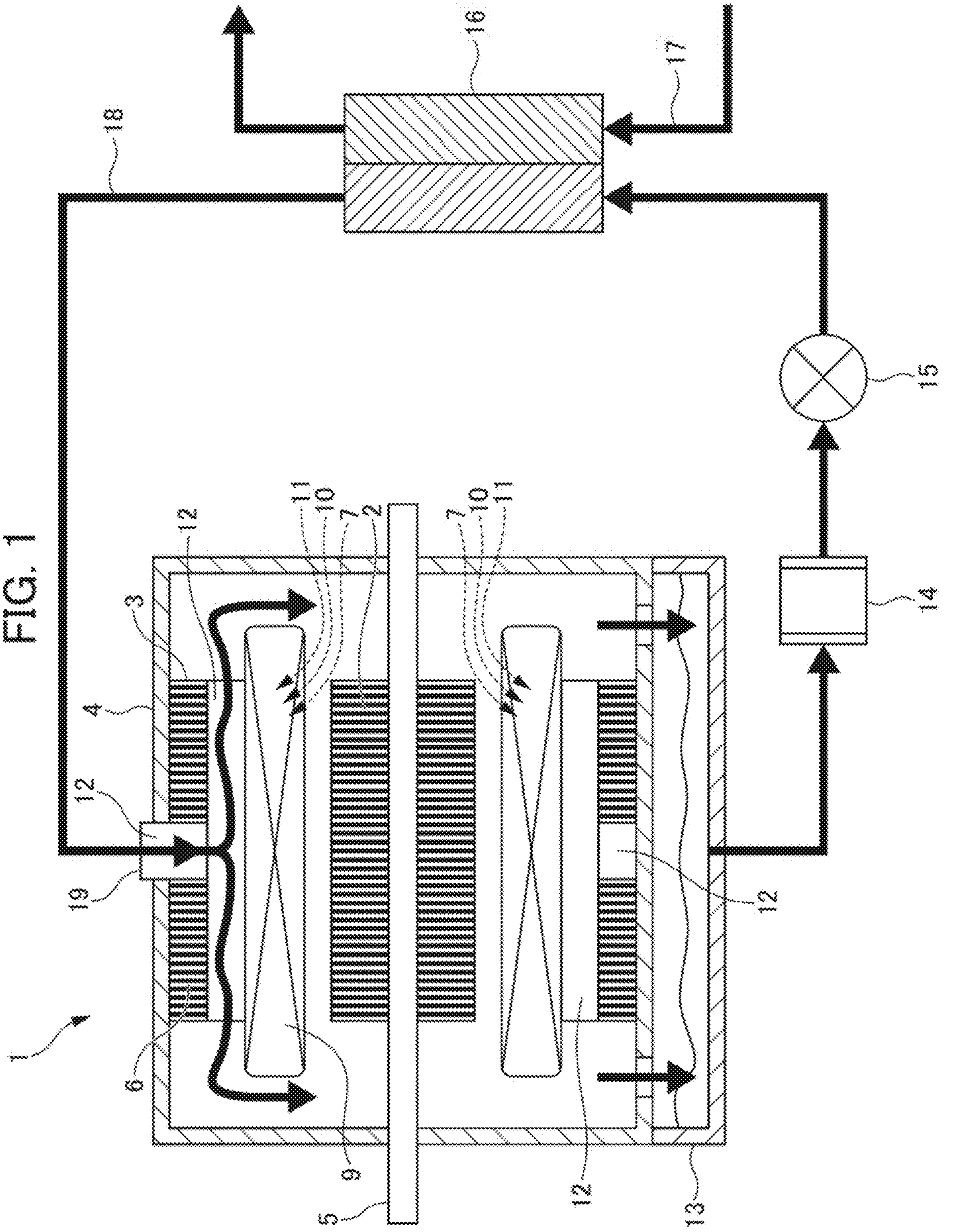
FIG. 1 is a conceptual diagram of a coolant circulation mechanism in a rotating electrical machine as an example of the present disclosure.

A rotating electrical machine according to the present disclosure will be described with reference to the drawings. In the drawings to which reference will be made below, corresponding components are denoted by the same signs. Regarding drawings including indications of directions, reference sign AD represents an axial direction of the rotating electrical machine, reference sign CD represents a circumferential direction of the rotating electrical machine, and reference sign RD represents a radial direction of the rotating electrical machine.

FIG. 1 is a conceptual diagram of a coolant circulation mechanism in a rotating electrical machine 1 as an example of the present disclosure. In FIG. 1, the rotating electrical machine 1 includes a rotor 2 and a stator 3. The rotor 2 has a cylindrical shape. The stator 3 has an annular shape in cross section and is disposed around the rotor 2 with a predetermined gap.

A casing 4 constituting a shell of the rotating electrical machine 1 is provided in contact with the outer periphery of the stator 3. A rotating shaft 5 penetrates through the rotation center of the rotor 2. The rotating shaft 5 is supported by bearings (not shown) on the axially opposite end surfaces of the casing 4. The annular stator 3 includes a stator core 6, and slots 7 are arranged in the circumferential direction at regular intervals in the stator core 6. In each of the slots 7, rectangular conductors 8 are arranged. The rectangular conductors (square conductors) 8, which have a rectangular cross section, are electrically connected to form a stator coil 9 arranged in the stator core 6. Insulating members 11 are arranged along an inner wall surface 10 of each slot 7. For example, sheets of insulating paper, which are adhesion layers each including a foamed adhesion layer on one surface and a non-foamed adhesion layer on the other surface, are applied as the insulating members 11. A configuration may be adopted in which the adhesion layers are formed only on portions where they are applicable.

While the rotating electrical machine 1 generates heat due to copper loss and iron loss, the stator core 6 and the stator coil 9 are cooled by coolant circulating through coolant flow paths 12 (described later) formed in the stator 3. For example, an automatic transmission fluid (ATF) or the like is applied as the coolant. The coolant from a coolant reservoir 13 disposed in the casing 4 is supplied to a suction side of a pump 15 through a filter 14. In a heat exchanger 16 disposed on a delivery side of the pump 15, the coolant is cooled by exchanging heat with coolant flowing through an external coolant flow path 17, and then, the cooled coolant is supplied to a coolant supply port 19 in the stator core 6 through a coolant supply path 18. The coolant supplied to the stator core 6 flows through a course described later, while cooling the stator core 6 and the rectangular conductors 8 in each slot 7, and is collected into the coolant reservoir 13, thereby repeating recirculation of the coolant.

Figure 2:
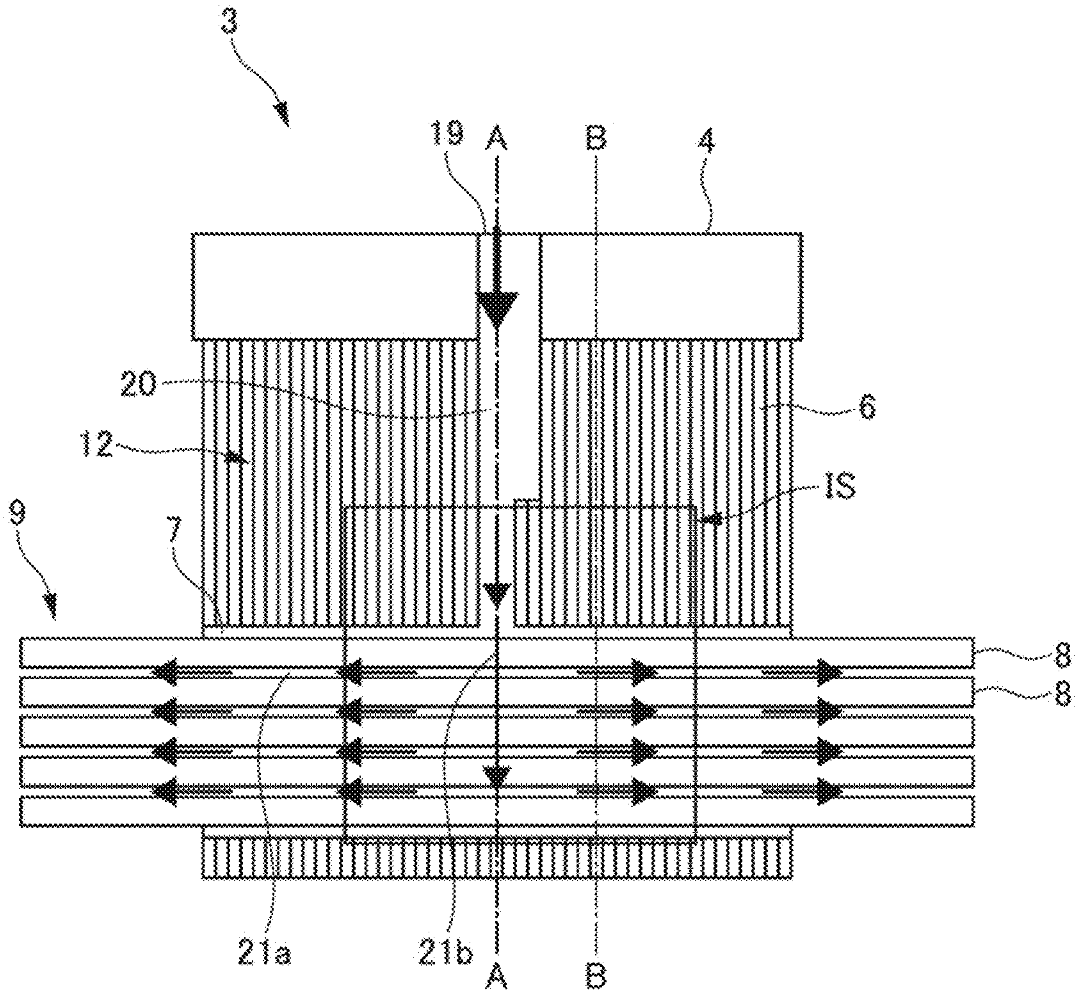
FIG. 2 is a schematic diagram showing an example of coolant flow paths from a stator core to a stator coil in the rotating electrical machine in FIG. 1.
Figure 3:
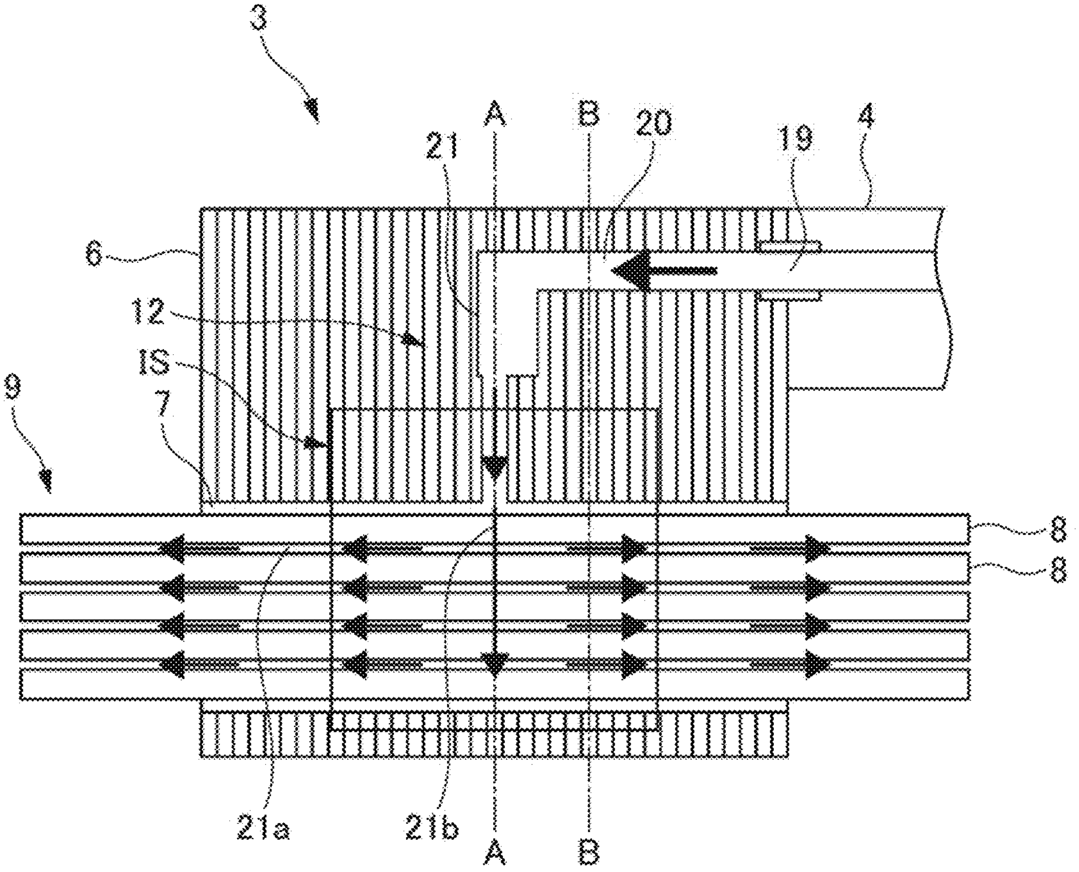
FIG. 3 is a schematic diagram showing another example of coolant flow paths from the stator core to the stator coil in the rotating electrical machine in FIG. 1.

FIG. 2 is a schematic diagram showing an example of the coolant flow path 12 from the stator core 6 to the stator coil 9 in the slot 7 in the rotating electrical machine 1 in FIG. 1. FIG. 3 is a schematic diagram showing another example of the coolant flow path 12 from the stator core 6 to the stator coil 9 in the rotating electrical machine 1 in FIG. 1. Referring to FIG. 2, the coolant flow path 12 that extends from the casing 4 of the stator 3 through an in-stator-core coolant flow path 20 provided in the stator core 6, and reaches the stator coil 9 in the slot 7 is formed.

The coolant flow path 12 in FIG. 2 is configured so that the coolant supply port 19 in the casing 4 and an outer periphery end of the slot 7 communicate with each other through the in-stator-core coolant flow path 20 provided in the stator core 6. The in-stator-core coolant flow path 20 of the coolant flow path 12 in FIG. 2 extends straight from the coolant supply port 19 in the casing 4 toward the inside in the radial direction, reaches the outer periphery end of the slot 7, and communicates with first coolant flow paths 21*a*, which will be described later. The first coolant flow paths 21*a* communicate with each second coolant flow path 21*b* extending along the longitudinal direction of a straight part of each rectangular conductor 8.

On the other hand, the in-stator-core coolant flow path 20 in the coolant flow path 12 in FIG. 3 extends in the axial direction from the coolant supply port 19 provided in a side end adjacent to the outer periphery of the stator core 6, changes direction toward the inside in the radial direction at an intermediate position of the thickness dimension of the stator core 6, reaches the outer periphery end of the slot 7, and communicates with the first coolant flow paths 21*a*, which will be described later. The first coolant flow paths 21*a* communicate with each second coolant flow path 21*b* extending along the longitudinal direction of the straight part of each rectangular conductor 8. The in-stator-core coolant flow path 20 in FIG. 3 communicates with a coolant circular communication path 21 formed in the circumferential direction (a direction intersecting with the page of FIG. 3), at a position on the way to the inside in the radial direction.

Figure 4A:
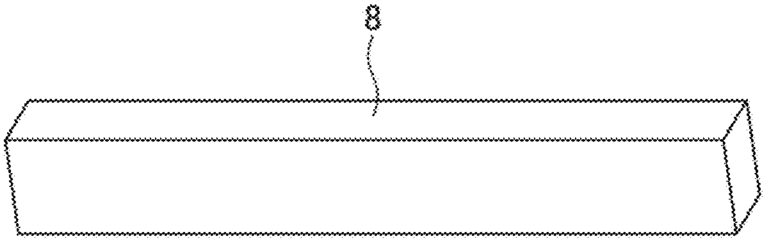
FIG. 4A shows one step in an example of a method of manufacturing a rectangular conductor for the stator coil applied to the rotating electrical machine in FIG. 1.
Figure 4B:
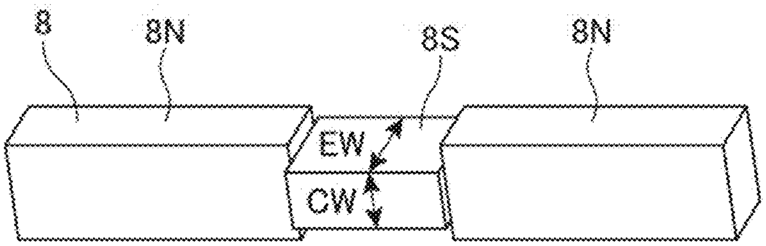
FIG. 4B shows a next step in the example of the method of manufacturing the rectangular conductor for the stator coil applied to the rotating electrical machine in FIG. 1.
Figure 4C:
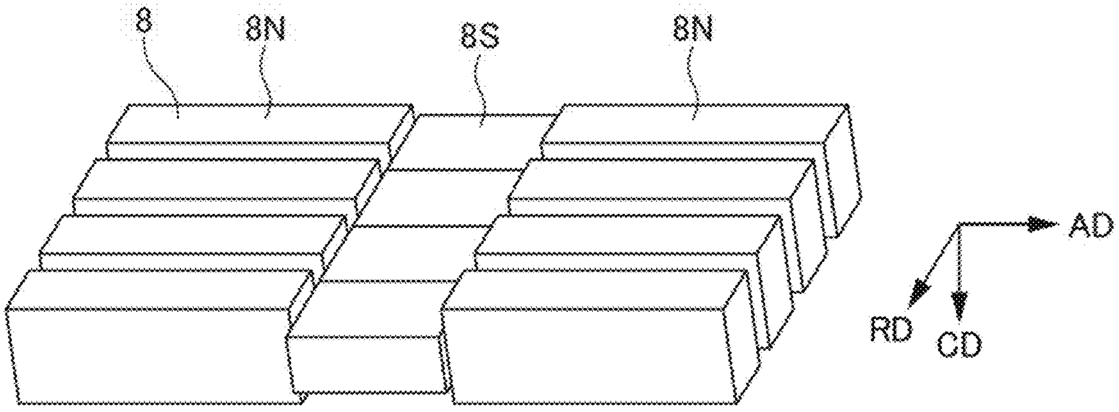
FIG. 4C shows a step subsequent to the next step in the example of the method of manufacturing the rectangular conductor for the stator coil applied to the rotating electrical machine in FIG. 1.

Here, the rectangular conductors 8 constituting the stator coil 9 are described with reference to FIGS. 4A, 4B, and 4C. FIG. 4A shows one step in an example of a method of manufacturing the rectangular conductor 8 for the stator coil 9 applied to the rotating electrical machine 1. FIG. 4B shows a next step in the example of the method of manufacturing the rectangular conductor 8. FIG. 4C shows a step subsequent to the next step in the example of the method of manufacturing the rectangular conductor 8.

According to the manufacturing method, first, the rectangular conductor 8 that has a constant and rectangular cross-sectional shape over the entire length, and constant dimensions, as in FIG. 4A, is prepared. In common with a typical rectangular conductor of this type, the rectangular conductor 8 in FIG. 4A is covered with an insulating film. Next, an intermediate site of a straight part of the conductor 8 is pressed by a pressing machine. The straight part will be disposed in the slot 7 after the conductors 8 are formed into the stator coil 9. By the pressing, as shown in FIG. 4B, the intermediate site is compressed and deformed to become a specific shape portion 8S where a thickness dimension in a direction orthogonal to the longitudinal direction of the rectangular conductor 8 is relatively small (a dimension CW in FIG. 4B), and a thickness dimension in another direction orthogonal to the longitudinal direction is relatively large (a dimension EW in FIG. 4B). The present inventor has verified that even the rectangular conductor 8 was deformed by partial application of pressure with the pressing machine as shown in FIG. 4B, the insulating film is not damaged.

In this case, normal shape portions 8N, which are different from the specific shape portion 8S, of the rectangular conductor 8 are not compressed by the pressing machine, and the initial state as shown in FIG. 4A, i.e., the state where the cross-sectional shape is rectangular and constant over the entire length, and the dimensions are constant and unchanged, is maintained. In the next step, the rectangular conductors 8 formed as in FIG. 4B are disposed in the slot 7 such that the specific shape portions 8S are aligned in position with each other as in FIG. 4C. The thus arranged rectangular conductors 8 (normal shape portions 8N) have ends configured to be in a predetermined electrical connection relationship, and function as the stator coil 9. Since each rectangular conductor 8 does not have a special groove along the longitudinal direction, it can be easily manufactured. Another process is conceivable in which: a rectangular conductor 8 without an insulating film is prepared in the stage shown in FIG. 4A; the rectangular conductor 8 is deformed by partial application of pressure with the pressing machine as shown in FIG. 4B; and thereafter, an insulating film is formed on portions other than sites to be welded, by applying (painting) an appropriate material.

As described above, the rectangular conductors 8 each including the specific shape portion 8S formed between the normal shape portions 8N are used, whereby the coolant flow path is formed around the stator coil 9. Next, referring to FIGS. 5, 6, and 7, the coolant flow path around the stator coil 9 is described.

Figure 5:
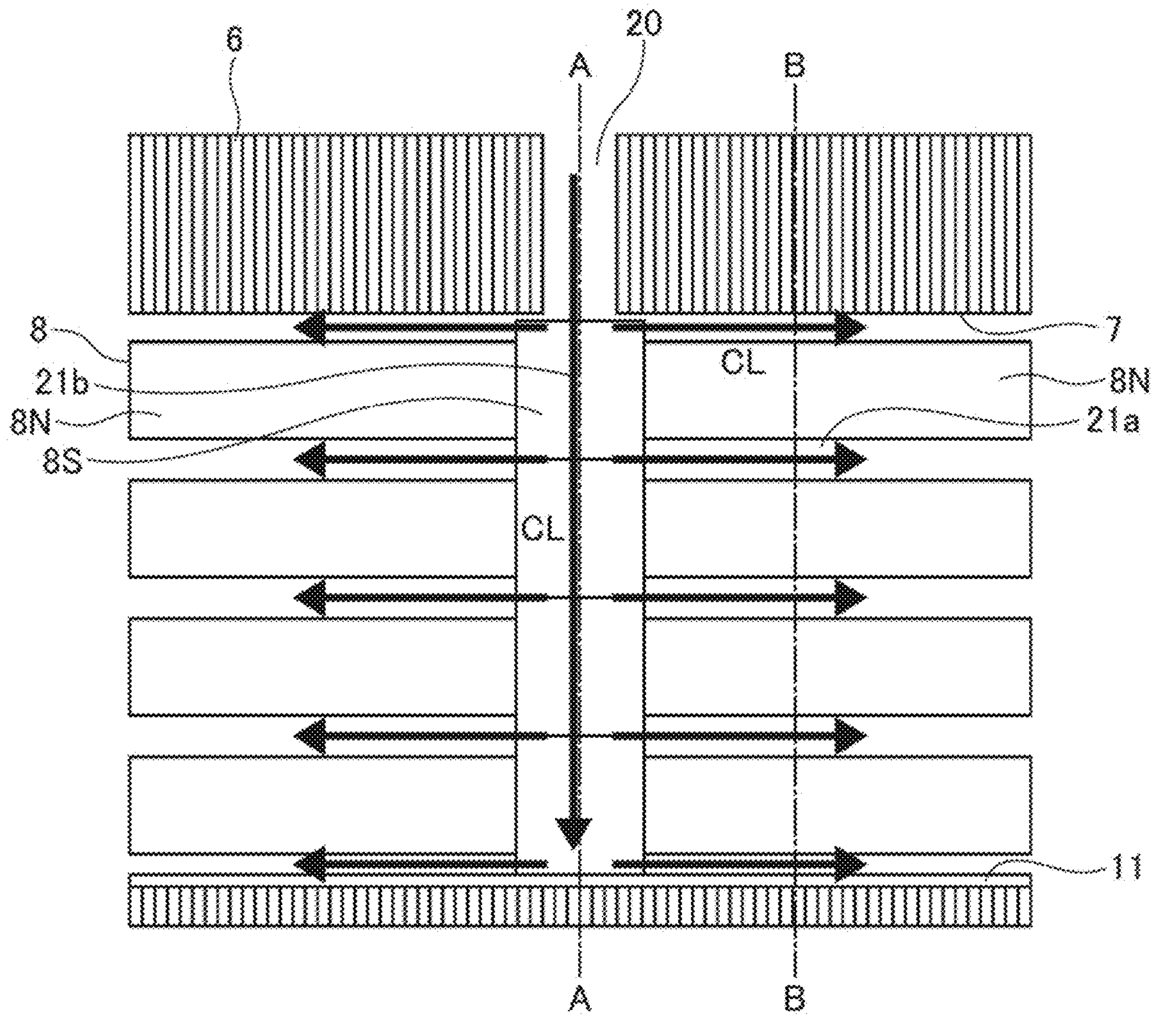
FIG. 5 is a schematic diagram showing coolant flow paths in the box indicated by IS in FIGS. 2 and 3.
Figure 6:
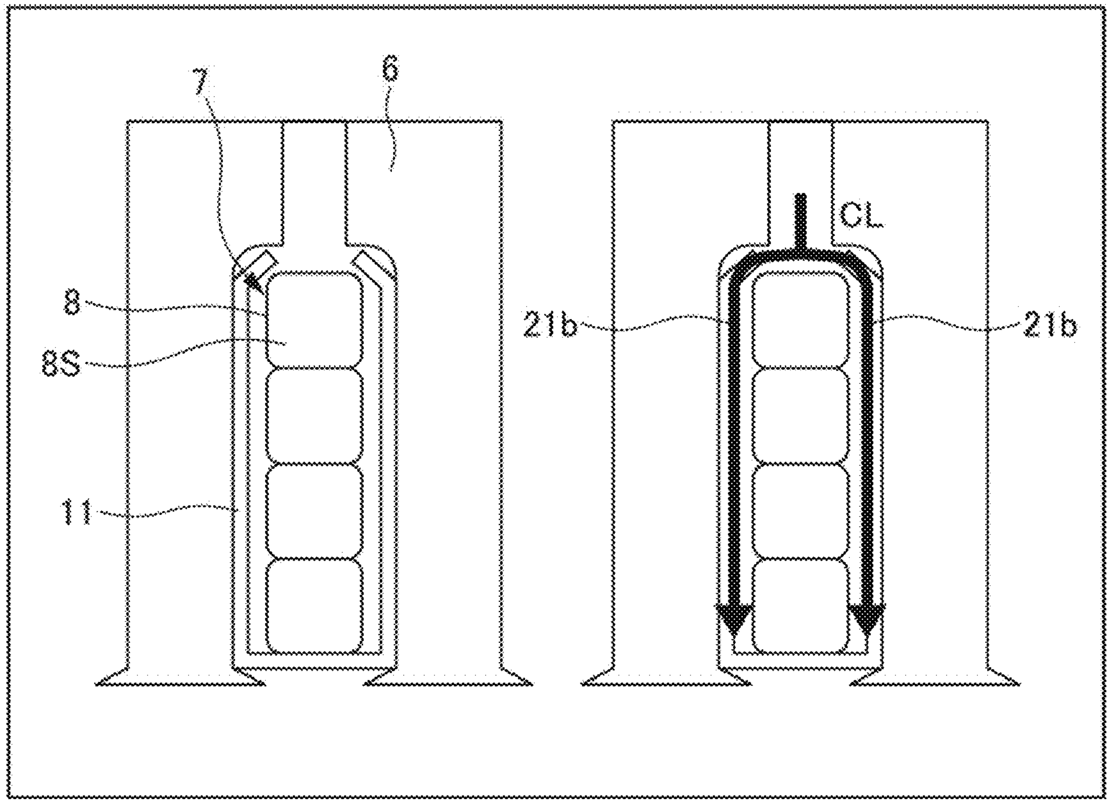
FIG. 6 is a schematic diagram showing the coolant flow paths in FIG. 5 in cross section along line A-A.
Figure 7:
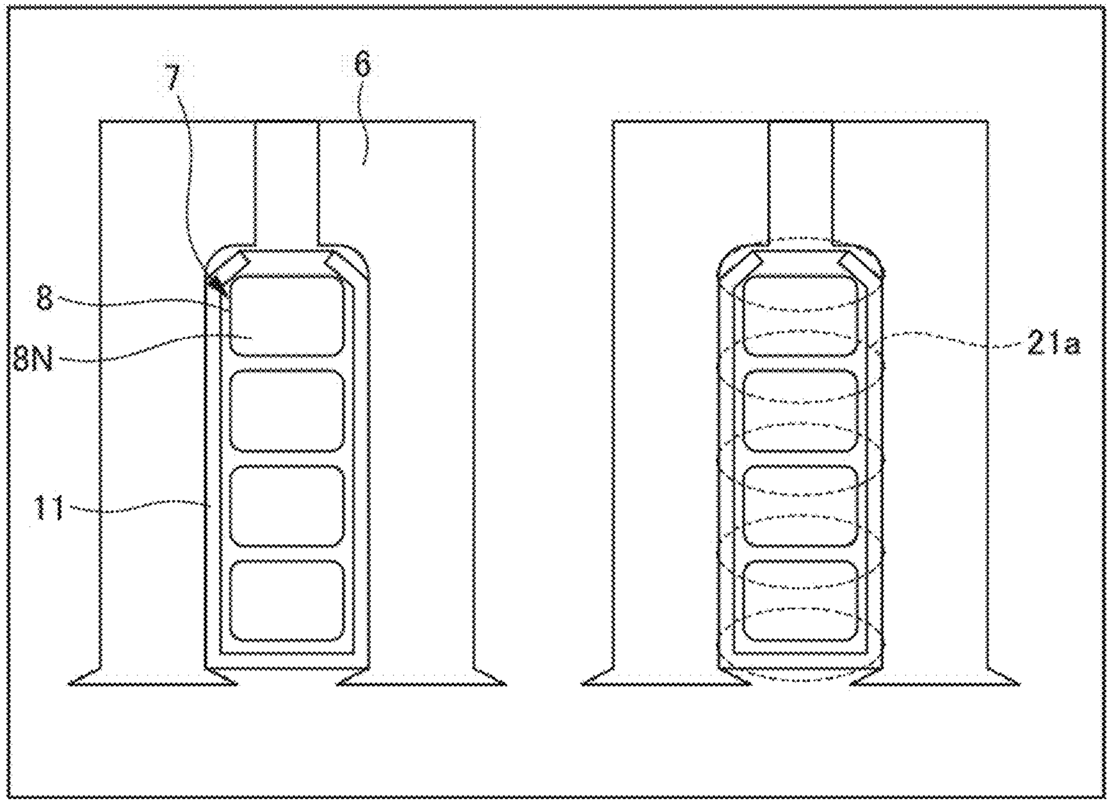
FIG. 7 is a schematic diagram showing the coolant flow paths in FIG. 5 in cross section taken along line B-B.

FIG. 5 is a schematic diagram showing the coolant flow paths in the box indicated by IS in FIGS. 2 and 3. FIG. 6 is a schematic diagram showing the coolant flow paths in FIG. 5 in cross section taken along line A-A. FIG. 7 is a schematic diagram showing the coolant flow paths in FIG. 5 in cross section taken along line B-B. In the portion shown in FIG. 6, the specific shape portions 8S of the rectangular conductors 8 are stacked with no gap therebetween in the radial direction in the slot 7. In FIG. 6, the specific shape portions 8S, which have the dimension CW and the dimension EW shown in FIG. 4B, are arranged such that the portions having the relatively large dimension EW are stacked in the radial direction in the slot 7. In this state, gaps formed between the inner wall of the slot 7 and the opposite sides of the specific shape portion 8S (opposite sides of the portion having the relatively small dimension CW) of each rectangular conductor 8 constitute the second coolant flow paths 21*b*. As schematically shown in the right portion in FIG. 6, the coolant CL circulates from the outside toward the inside in the radial direction through the second coolant flow paths 21*b*.

On the other hand, in the portion shown in FIG. 7, the normal shape portions 8N of the rectangular conductors 8 are stacked with gaps therebetween in the radial direction in the slot 7. In FIG. 7, the gaps are formed between the normal shape portions 8N, which are different from the specific shape portions 8S, of the rectangular conductors 8, as a result of arranging the specific shape portion 8S such that not their portions having the dimension CW but their portions having the relatively large dimension EW are stacked as in FIG. 6. The gaps constitute the first coolant flow paths 21*a*. Sites schematically encircled by broken lines in the right portion in FIG. 7 are the first coolant flow paths 21*a*. The coolant CL circulates through the first coolant flow paths 21*a* in the axial direction of the rotating electrical machine 1.

Figure 8:
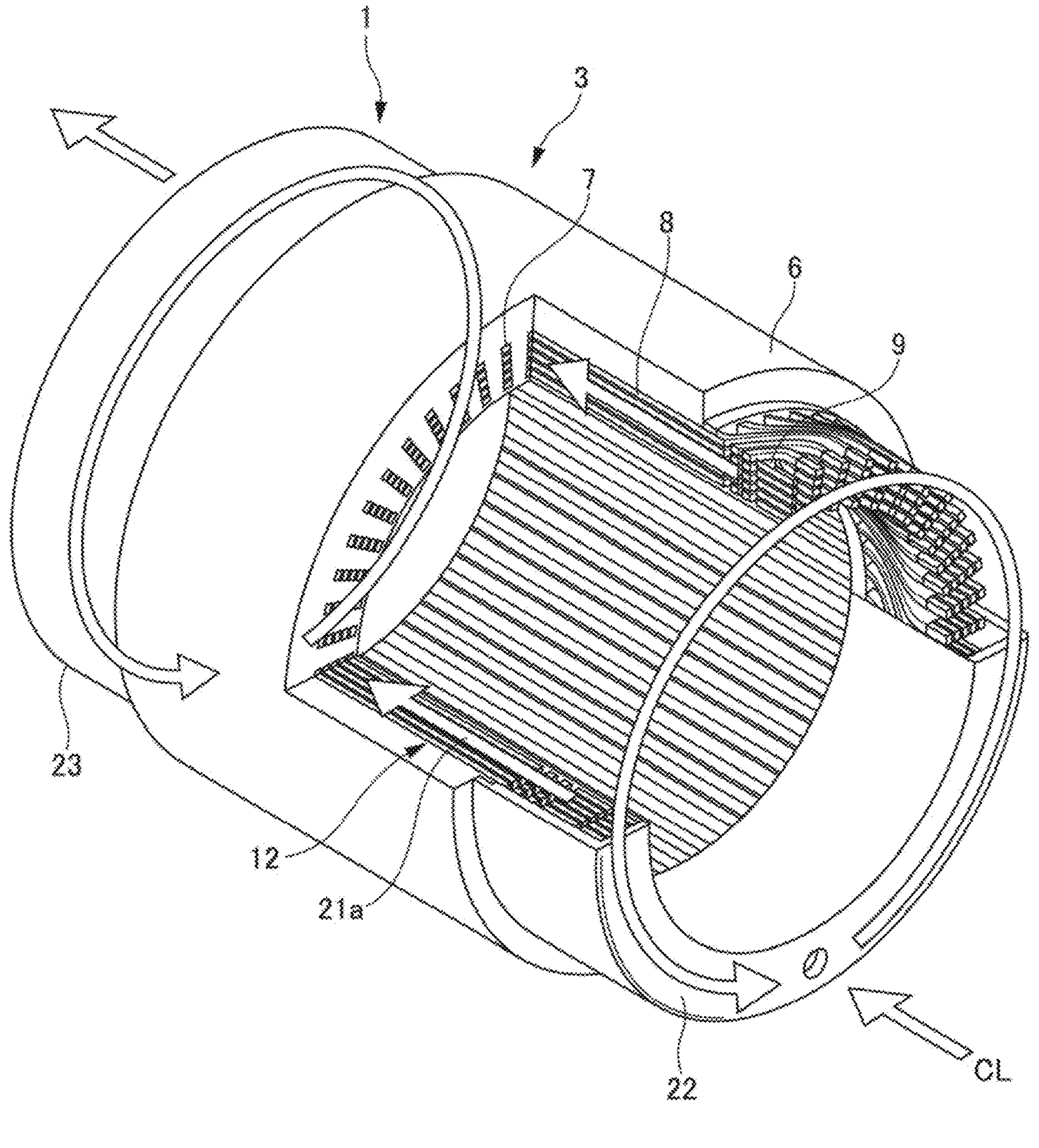
FIG. 8 is a perspective view showing a stator of a rotating electrical machine as another example of the present disclosure.

Next, with reference to FIG. 8, a rotating electrical machine 1 that is another example of the present disclosure is described. FIG. 8 is a perspective view showing a stator 3 of the rotating electrical machine 1 as the other example of the present disclosure. The rotating electrical machine 1 includes a stator core 6 having an annular shape in cross section and including slots 7 formed at regular intervals and arranged side by side in the circumferential direction. In each of the slots 7, rectangular conductors 8 are arranged. The rectangular conductors (square conductors) 8, which have a rectangular cross section, are electrically connected at their ends to thereby form a stator coil 9.

The rectangular conductors 8 are similar to those described with reference to FIGS. 4B and 4C. A front cover member 22 and a rear cover member 23 that have an annular shape and respectively cover the front and rear ends of the stator coil 9 are attached to the axial front end (near side in FIG. 8) and the axial rear end (far side in FIG. 8) of the stator core 6. The front cover member 22 and the rear cover member 23 accommodate therein connection conductor portions provided at the front end and the rear end of the stator coil 9, respectively, and constitute part of a flow path for coolant CL. Specifically, the coolant flow paths 12 are formed in which the coolant CL introduced into the front cover member 22 annularly circulates in the front cover member 22, passes through the first coolant flow paths 21*a* formed between the rectangular conductors 8 in the slots 7 (partially through second coolant flow paths 21*b*), reaches the rear cover member 23, and circulates through a coolant circulation path (not shown).

Figure 9:
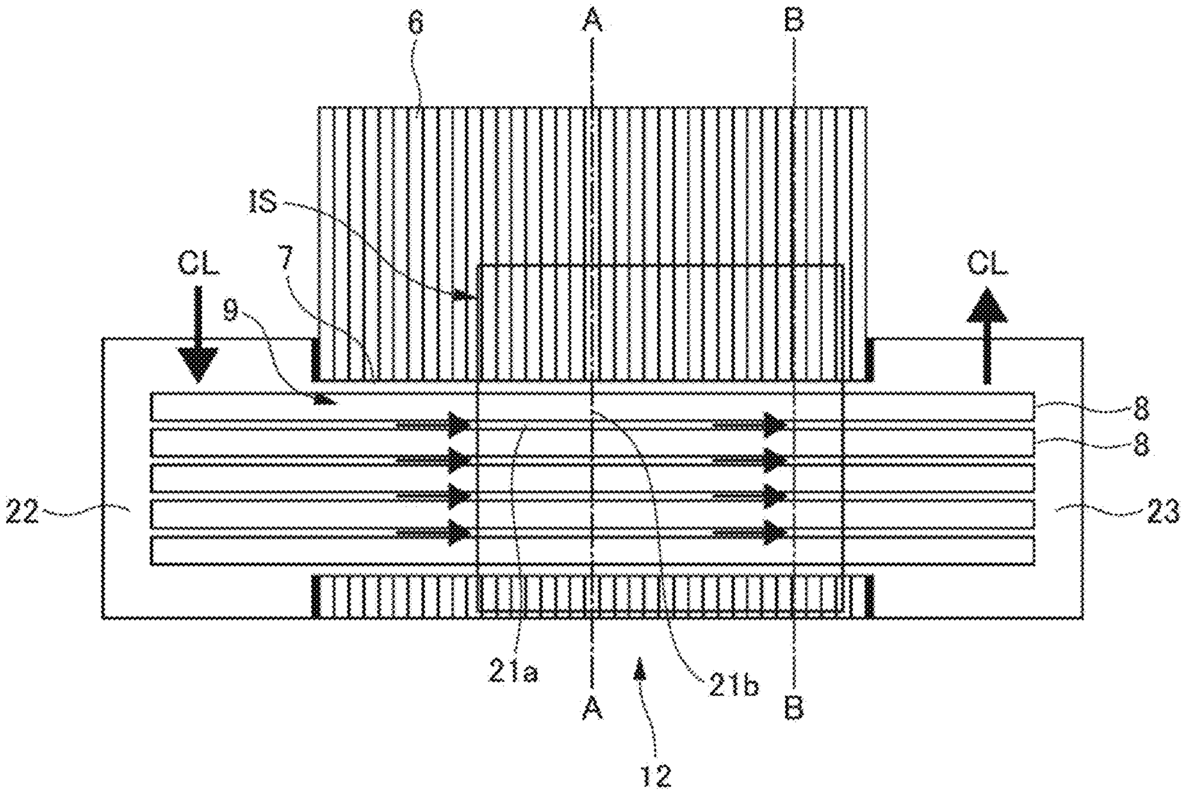
FIG. 9 is a schematic diagram showing an example of the coolant flow paths in the slot in the rotating electrical machine in FIG. 8.
Figure 10:
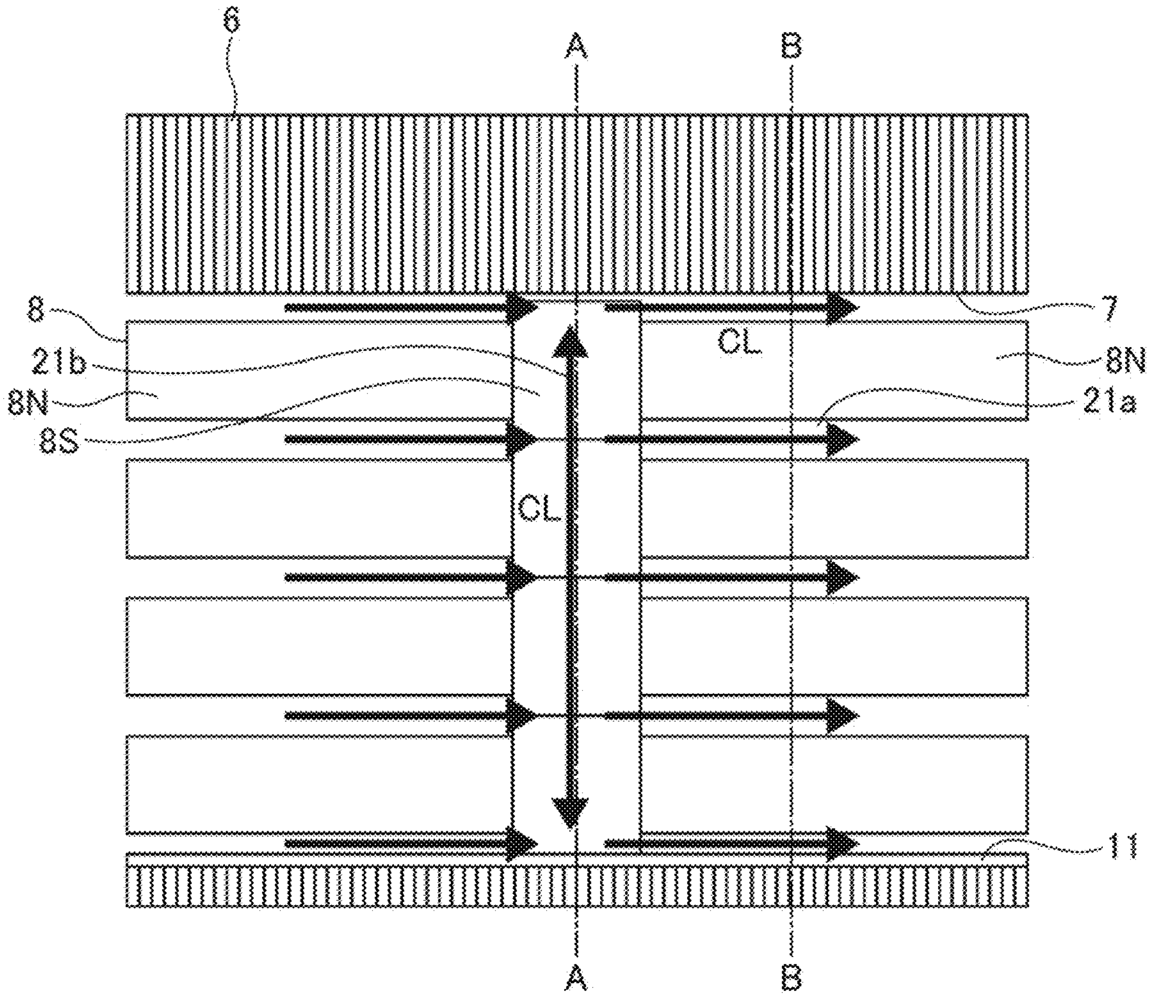
FIG. 10 is a schematic diagram showing the coolant flow paths in the box indicated by IS in FIG. 9.
Figure 11:
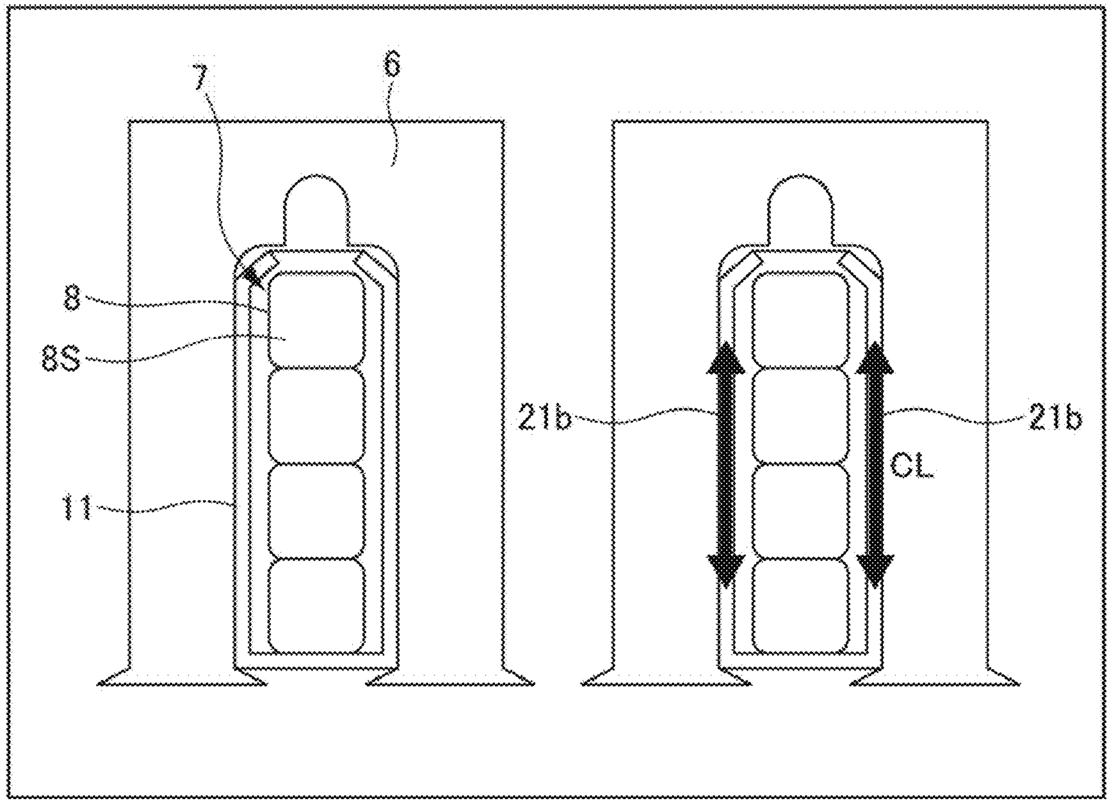
FIG. 11 is a schematic diagram showing the coolant flow paths in FIG. 10 in cross section taken along line A-A.
Figure 12:
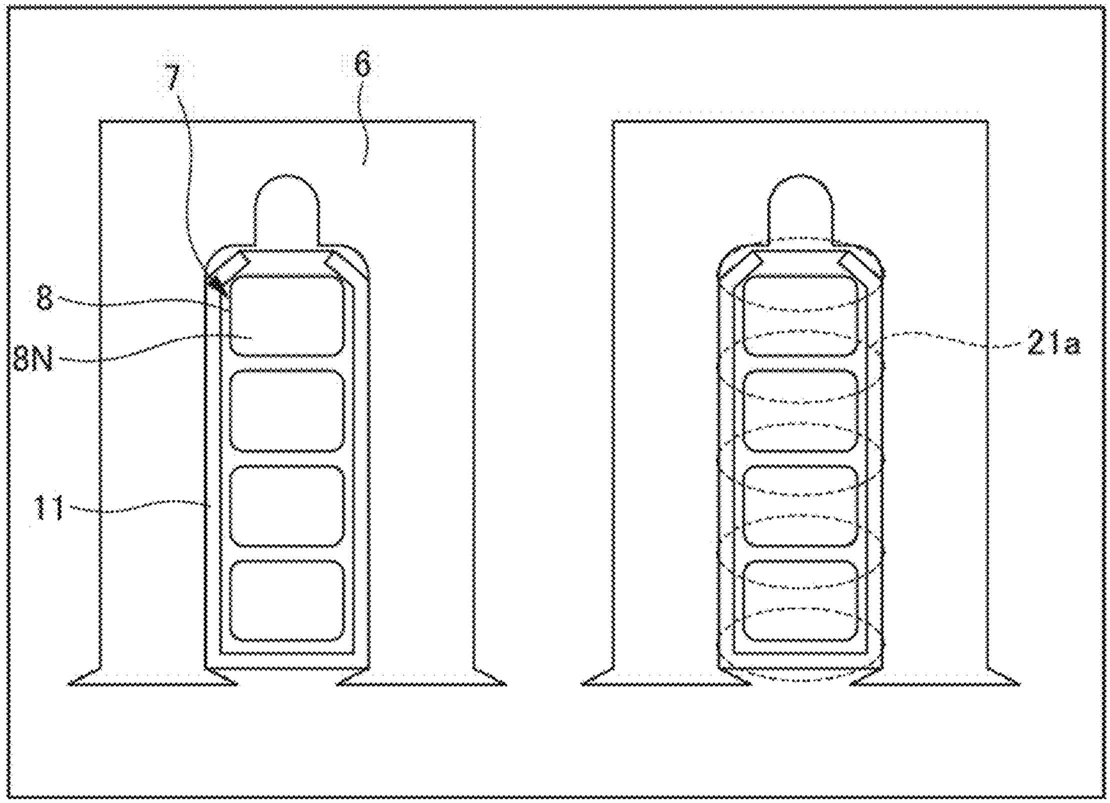
FIG. 12 is a schematic diagram showing the coolant flow paths in FIG. 10 in cross section taken along line B-B.

FIG. 9 is a schematic diagram showing an example of the coolant flow path 12 in the slot 7 in the rotating electrical machine 1 in FIG. 8. FIG. 10 is a schematic diagram showing the coolant flow path in the box indicated by IS in FIG. 9. FIG. 11 is a schematic diagram showing the coolant flow paths in FIG. 10 in cross section taken along line A-A. FIG. 12 is a schematic diagram showing the coolant flow paths in FIG. 10 in cross section taken along line B-B. The coolant flow path 12 in FIG. 9 allows the coolant CL introduced into the front cover member 22 to pass through the first coolant flow paths 21*a* constituted by the gaps between the rectangular conductors 8 (the normal shape portions 8N of the rectangular conductors 8) (partially through the second coolant flow paths 21*b* between the opposite sides of the rectangular conductor 8 and the inner walls of the slot 7), to flow to the rear cover member 23, and to be returned to a circulation path (not shown).

In FIGS. 10, 11, and 12, a manner in which the first coolant flow paths 21*a* and the second coolant flow paths 21*b* are formed and a manner in which the coolant CL circulates through the first coolant flow paths 21*a* and the second coolant flow paths 21*b* are substantially similar to those described with reference to FIGS. 5, 6, and 7. Accordingly, the descriptions that have already been provided with reference to FIGS. 5, 6, and 7 apply to the manner in which the first coolant flow paths 21*a* and the second coolant flow paths 21*b* in FIGS. 10, 11, and 12 are formed and the manner in which the coolant CL circulates through the first coolant flow paths 21*a* and the second coolant flow paths 21*b*.

Figure 13:
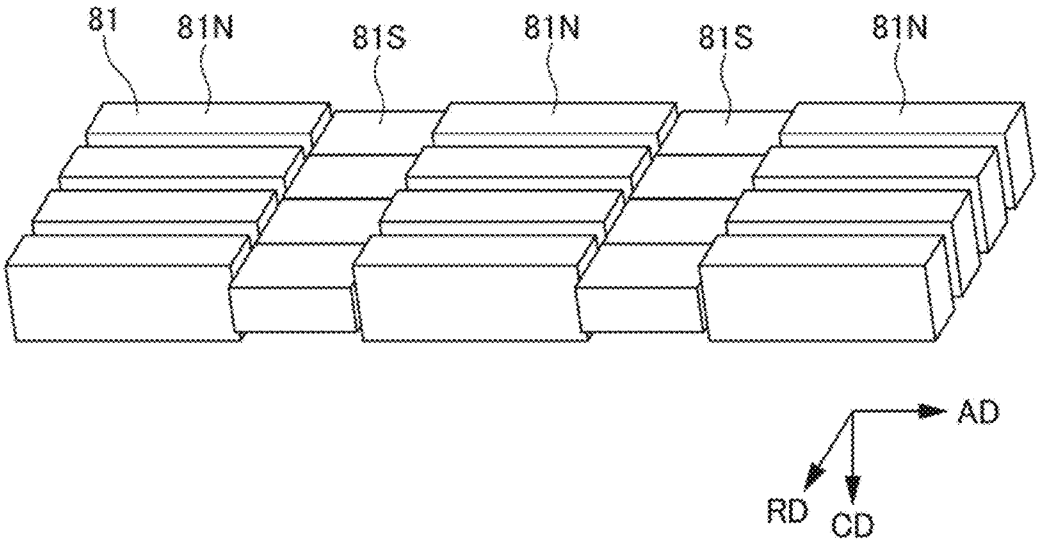
FIG. 13 is a diagram showing another example of rectangular conductors arranged in the slot in the rotating electrical machine in FIGS. 1 and 8.

FIG. 13 shows another example of rectangular conductors arranged in slots in the rotating electrical machine in FIGS. 1 and 8. In the example shown in FIG. 13, each rectangular conductor 81 includes specific shape portions 81S at two sites in its straight part to be arranged in each slot 7 in the rotating electrical machine 1. A normal shape portion 81N is provided between and continuous with the specific shape portions 81S at the two sites, and further normal shape portions 81N are continuous with the opposite ends of the straight part. The specific shape portions 81S themselves are similar to the specific shape portions 8S described above. The normal shape portions 81N themselves are similar to the normal shape portions 8N described above. By forming each rectangular conductor to have the specific shape portions 81S at the two sites in its straight part as described above, two second coolant flow paths 21*b* can be formed in the radial direction in one slot 7. Accordingly, the overall resistance of the flow tube related to the coolant CL can be reduced, and the energy efficiency of the rotating electrical machine 1 can be improved.

Figure 14:
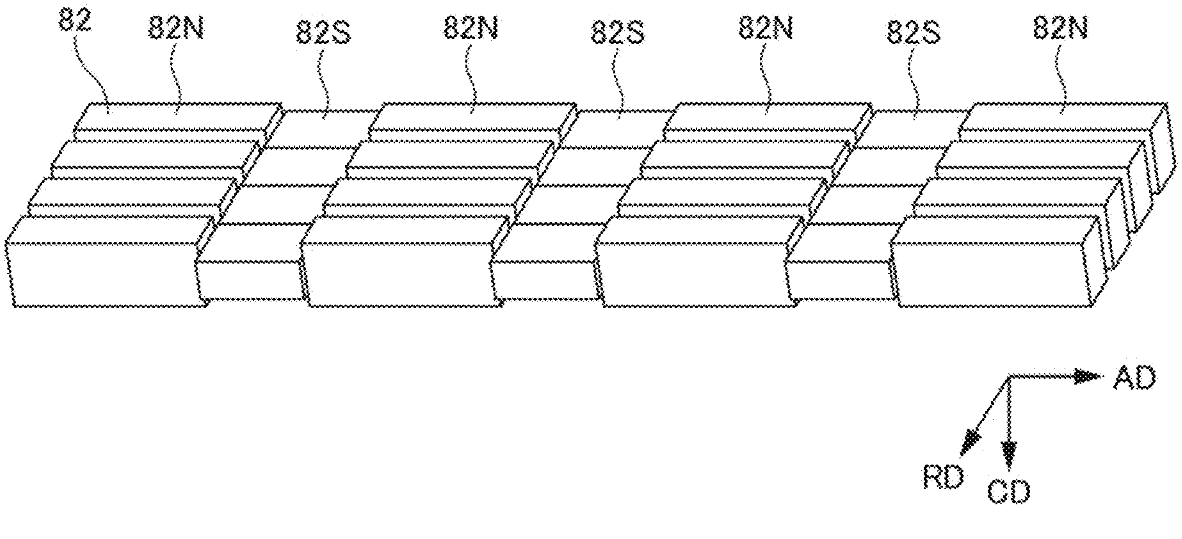
FIG. 14 is a diagram showing still another example of rectangular conductors arranged in the slot in the rotating electrical machine in FIGS. 1 and 8.

FIG. 14 shows still another example of rectangular conductors arranged in each slot in the rotating electrical machine in FIGS. 1 and 8. In the example shown in FIG. 14, each rectangular conductor 82 includes specific shape portions 82S at three sites in its straight part to be arranged in each slot 7 in the rotating electrical machine 1. Normal shape portions 82N are provided between and continuous with the specific shape portions 82S at the three sites, and further normal shape portions 82N are continuous with the opposite ends of the straight part. The specific shape portions 82S themselves are similar to the specific shape portions 8S described above. The normal shape portions 82N themselves are similar to the normal shape portions 8N described above. By forming each rectangular conductor to have the specific shape portions 82S at the three sites in its straight part as described above, three second coolant flow paths 21*b* can be formed in the radial direction in one slot 7. Accordingly, the resistance of the flow tube related to the coolant CL can be reduced, and the energy efficiency of the rotating electrical machine 1 can be improved.

Figure 15A:
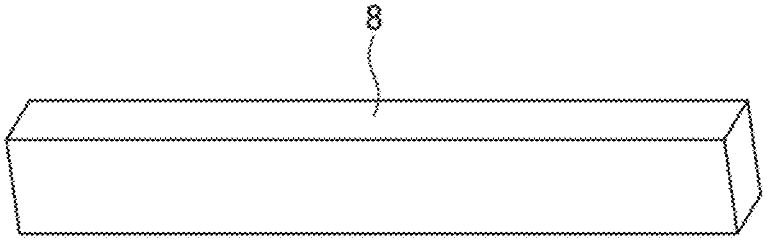
FIG. 15A shows one step in another example of a method of manufacturing the rectangular conductor applied to the rotating electrical machine in FIGS. 1 and 8.
Figure 15B:
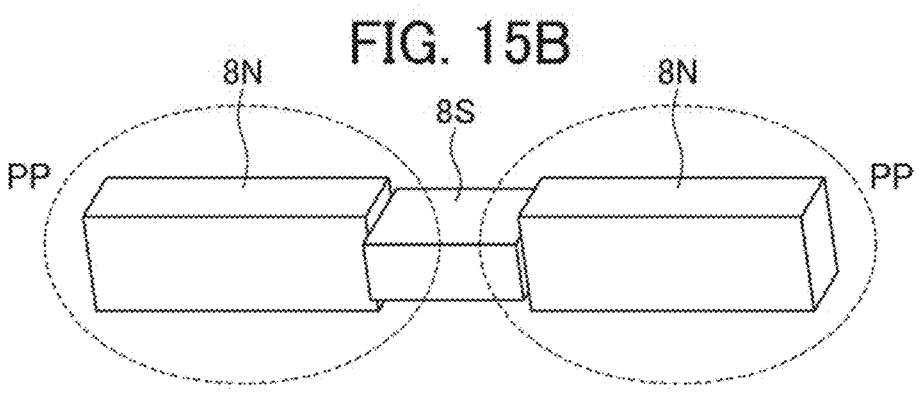
FIG. 15B shows a next step in the other example of a method of manufacturing the rectangular conductor applied to the rotating electrical machine in FIGS. 1 and 8.
Figure 15C:
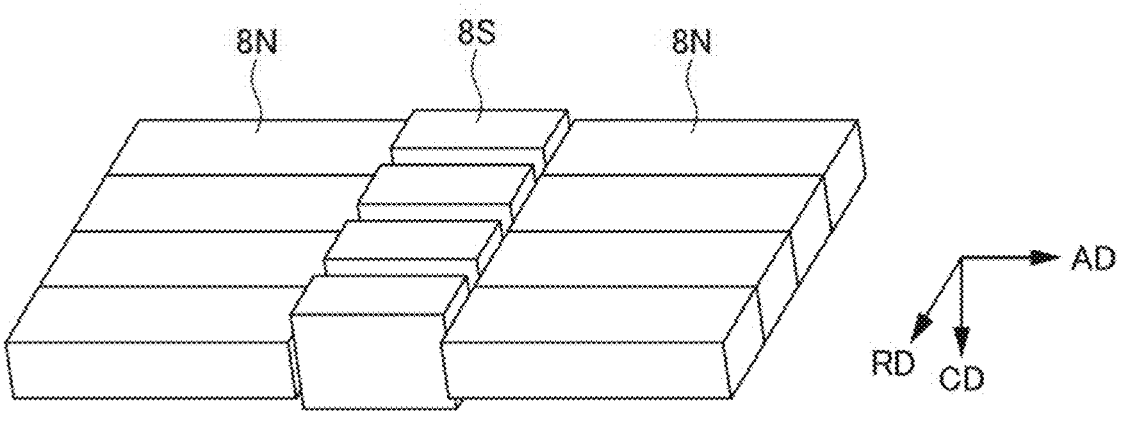
FIG. 15C shows a step subsequent to the next step in the other example of a method of manufacturing the rectangular conductor applied to the rotating electrical machine in FIGS. 1 and 8.

Here, with reference to FIGS. 15A, 15B, and 15C, another example of the method of manufacturing the rectangular conductor is described. FIG. 15A shows one step in the other example of the method of manufacturing the rectangular conductor 8 applied to the rotating electrical machine 1 in FIGS. 1 and 8. FIG. 15B shows a next step in the other example of the method of manufacturing the rectangular conductor 8 applied to the rotating electrical machine 1. FIG. 15C shows a next step subsequent to the next step in the other example of the method of manufacturing the rectangular conductor 8 applied to the rotating electrical machine 1 in FIGS. 1 and 8.

According to the manufacturing method in FIGS. 15A, 15B, and 15C, first, the rectangular conductor 8 that has a constant and rectangular cross-sectional shape over the entire length, and constant dimensions, as in FIG. 15A, is prepared. In this case, a conductor having a rectangular cross section in which ratio of the long side to the short side is the same as the ratio of EW to CW of the specific shape portion 8S in FIG. 4B is selected as the rectangular conductor 8.

Next, for each rectangular conductor 8, the opposite end portions of the straight part to be disposed in the slot 7, except for an intermediate site (a center position), are pressed by a pressing machine. In FIG. 15B, the portions to be pressed are indicated by broken-line circles PP. As shown in FIG. 15B, by the pressurization, the opposite end portions are compressed and deformed into portions having a rectangular cross section corresponding to the normal shape portion 8N in FIG. 4A.

The specific shape portion 8S, which is different from the normal shape portion 8N, of the rectangular conductor 8 is not pressed by the pressing machine and maintains the original shape as shown in FIG. 15A, i.e., the cross section is rectangular and constant over the entire length, and the dimensional ratio of the short side to the long side of the rectangle is maintained to the ratio of CW to EW defined for the specific shape portion 8S in FIG. 4B.

In the next step, the rectangular conductors 8 formed as in FIG. 15B are disposed in the slot 7 such that the specific shape portions 8S are aligned in position with each other as in FIG. 15C. Subsequently, the ends of the arranged rectangular conductors 8 (normal shape portions 8N) are joined to be in a predetermined electrical connection relationship by welding or the like, whereby the rectangular conductors 8 are brought into a state of functioning as the stator coil 9. As described above, the rectangular conductors 8 each including the specific shape portion 8S formed between the normal shape portions 8N are used, thereby forming the coolant flow path around the stator coil 9. Each rectangular conductor 8 does not have a special groove along the longitudinal direction, it can be easily manufactured.

Figure 16:
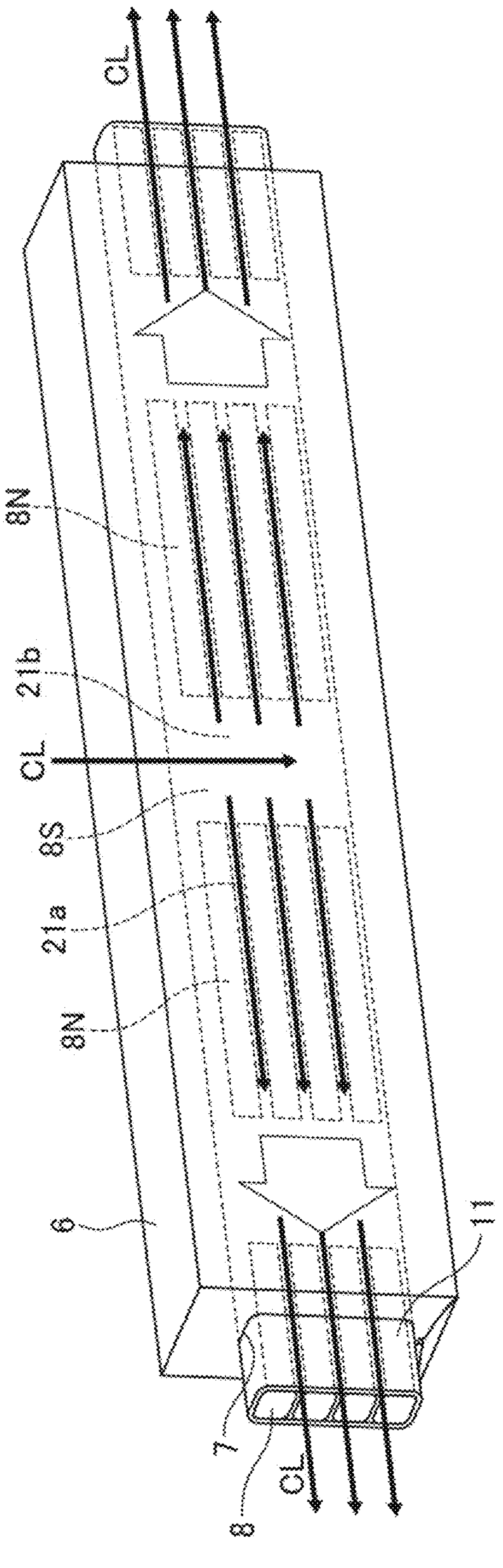
FIG. 16 is a transparent perspective view showing an example of a configuration around the coolant flow paths shown in FIGS. 5 to 7.
Figure 17:
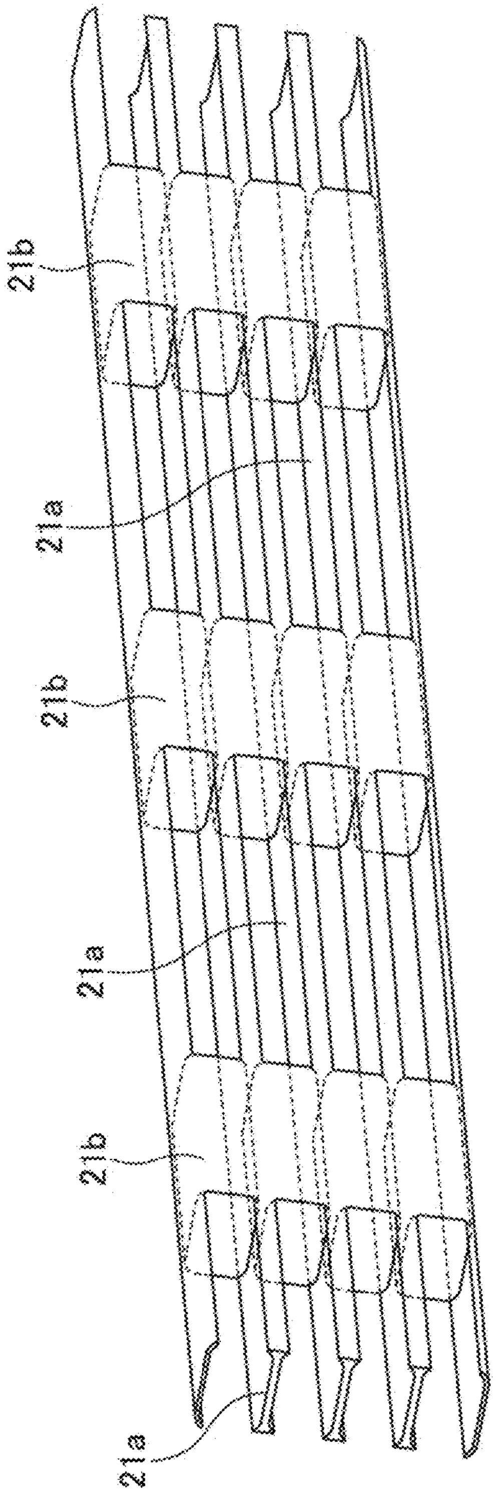
FIG. 17 is a conceptual diagram showing an extracted portion of the coolant flow paths in FIG. 16.

Next, with reference to FIGS. 16 and 17, an overview of an aspect of the flow path for the coolant CL in one slot 7 in the rotating electrical machine 1 according to the present disclosure is provided. FIG. 16 is a transparent perspective view showing an example of the configuration around the coolant flow paths shown in FIGS. 5 to 7. FIG. 17 is a conceptual diagram showing an extracted portion of the coolant flow paths in FIG. 16. As described in the overview provided with reference to FIG. 1, the coolant CL is supplied from the outside to the axially intermediate position of the stator core 6 of the rotating electrical machine 1.

The supplied coolant CL flows toward the inside in the radial direction through the second coolant flow paths 21*b* formed at three intermediate sites in the slot 7 as gaps between the inner wall of the slot 7 and the specific shape portions 8S of the rectangular conductors 8 stacked in the radial direction in the slot 7. In the example shown in FIGS. 16 and 17, the second coolant flow paths 21*b* are provided at three sites including the axial center position of the slot 7, and two positions respectively away from the axial center position toward the one end side and the other end side in the axial direction. In detail, each second coolant flow path 21*b* is formed as a gap between the insulating paper as the insulating member 11 in tight contact with the inner wall of the slot 7 and the outer surface of each rectangular conductor 8.

The coolant CL that has flowed through the second coolant flow path 21*b* passes through the first coolant flow path 21*a* communicating with the second coolant flow path 21*b*. Each first coolant flow path 21*a* is formed along the longitudinal direction of the rectangular conductors 8 as the gap between the normal shape portions 8N of the rectangular conductor 8. The coolant CL flowing from the second coolant flow path 21*b* into the first coolant flow path 21*a* passes through the first coolant flow path 21*a* in the axial direction of the rotating electrical machine 1.

The coolant CL bifurcates from the second coolant flow path 21*b* at the axial center position so as to flow toward the one end side and the other end side of the first coolant flow path 21*a* in the axial direction. The coolant CL circulating through the second coolant flow paths 21*b* and the first coolant flow paths 21*a* flows to the one end side and to the other end side in the axial direction in the slot 7, while exchanging heat with the rectangular conductors 8 and cooling heat generated due to copper loss, is discharged and dripped from the axially opposite ends of the slot 7, flows into the coolant reservoir 13 (see FIG. 1), and is collected as described above.

Figure 18:
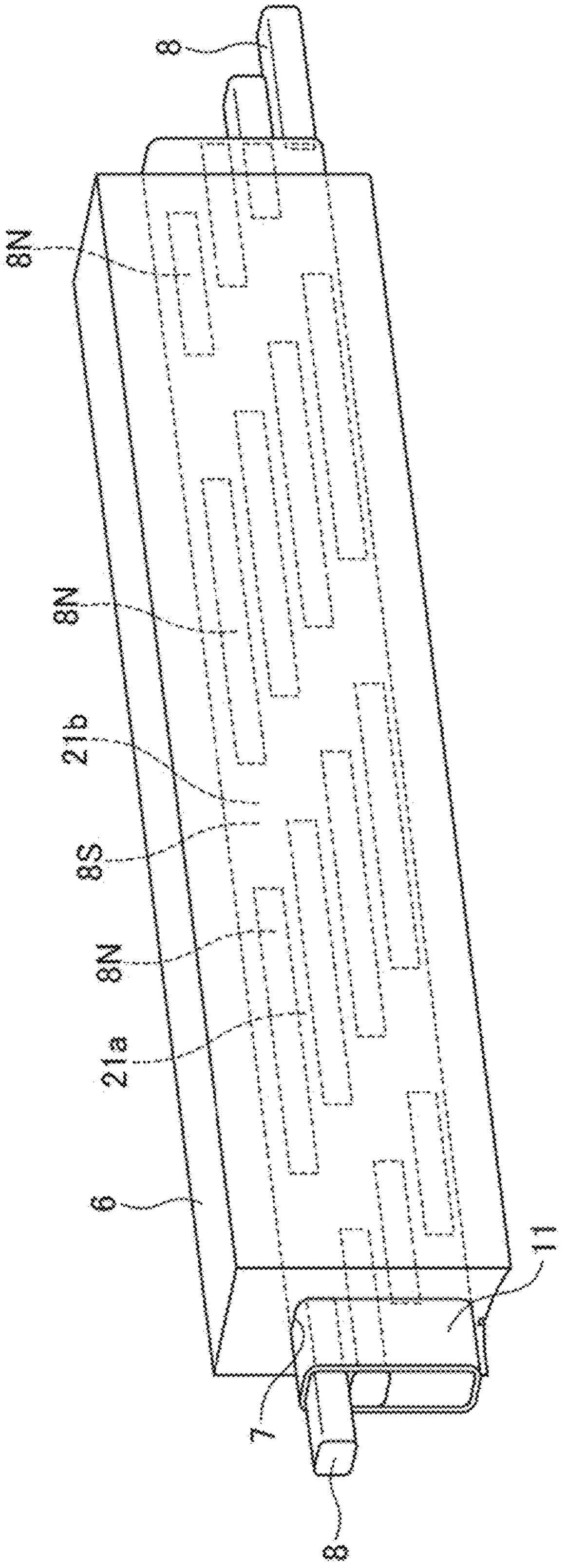
FIG. 18 is a transparent perspective view showing another example of a configuration around the coolant flow paths shown in FIGS. 5 to 7.
Figure 19:
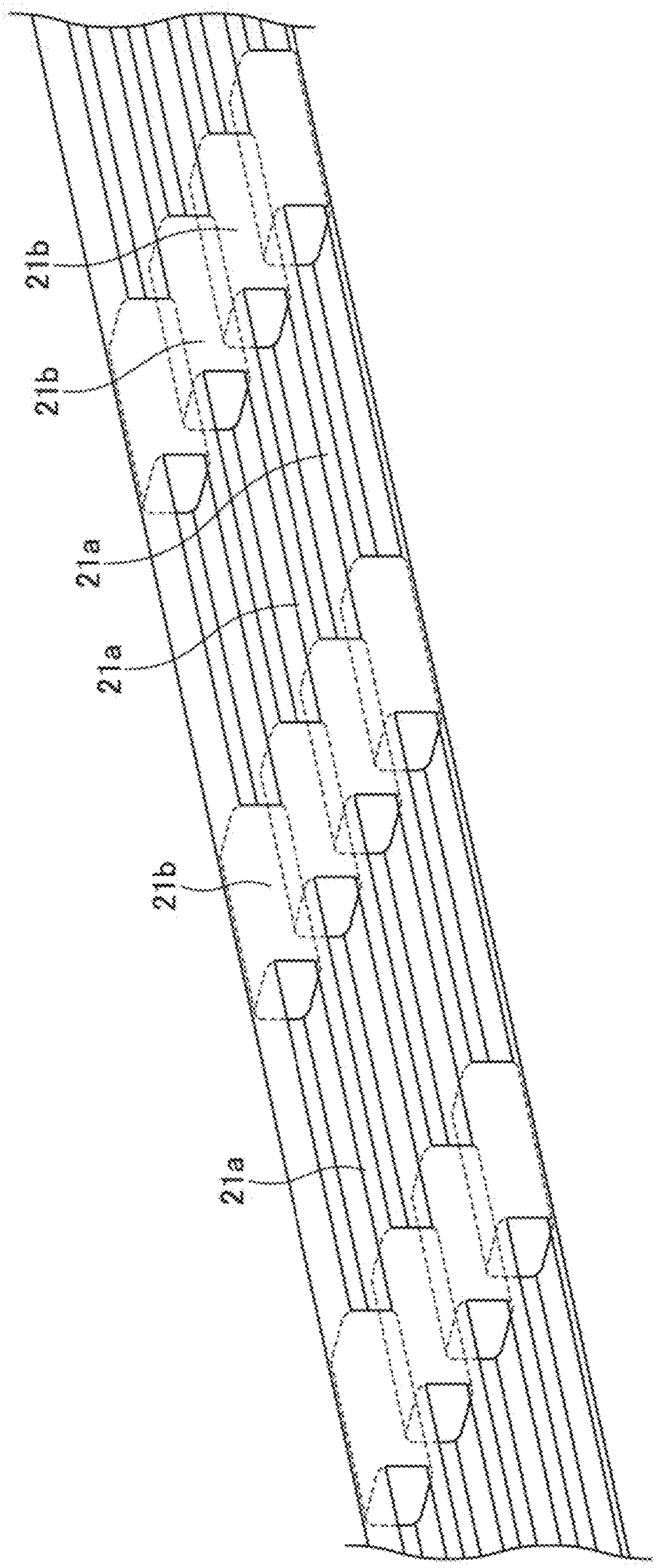
FIG. 19 is a conceptual diagram showing an extracted portion of the coolant flow paths in FIG. 18.

Next, with reference to FIGS. 18 and 19, an overview of another aspect of the flow path for the coolant CL in one slot 7 of the rotating electrical machine 1 according to the present disclosure is provided. FIG. 18 is a transparent perspective view showing another example of the configuration around the coolant flow paths shown in FIGS. 5 to 7. FIG. 19 is a conceptual diagram showing an extracted portion of the coolant flow paths in FIG. 18. As described in the overview provided with reference to FIG. 1, the coolant CL is supplied from the outside to the axially intermediate position of the stator core 6 of the rotating electrical machine 1.

The supplied coolant CL flows toward the inside in the radial direction through the second coolant flow paths 21*b* formed at three axially intermediate sites in the slot 7 as gaps between the inner wall of the slot 7 and the specific shape portions 8S of the rectangular conductors 8 stacked in the radial direction in the slot 7. In detail, each second coolant flow path 21*b* is formed as a gap between the insulating paper as the insulating member 11 in tight contact with the inner wall of the slot 7 and the outer surface of each rectangular conductor 8.

In the example shown in FIGS. 18 and 19, an aspect is adopted in which the phase positions of the specific shape portions 8S of the rectangular conductors 8 axially deviate from each other in sequence in a radially inward direction from the rectangular conductor 8 at the outermost periphery to the rectangular conductor 8 at the innermost periphery. Accordingly, in the slot 7, each second coolant flow path 21*b* extending from the outer periphery side to the inner periphery side is inclined with respect to the radial direction in accordance with the axial deviation in phase of the specific shape portions 8S described above. The above-described second coolant flow paths 21*b* are provided to be inclined toward the inner periphery from the three sites, which include the axial center position at the outermost periphery of the slot 7 and the two positions away from the axial center position toward the one end side and the other end side in the axial direction.

The coolant CL flowing from through the second coolant flow path 21*b* passes through the first coolant flow path 21*a* that communicates with the second coolant flow path 21*b*. Each first coolant flow path 21*a* is formed along the longitudinal direction of the rectangular conductors 8 as the gap between the normal shape portions 8N of the rectangular conductor 8. The coolant CL flowing from the second coolant flow path 21*b* into the first coolant flow path 21*a* passes through the first coolant flow path 21*a* in the axial direction of the rotating electrical machine 1.

The coolant CL bifurcates from the second coolant flow path 21*b* at the axial center position so as to flow toward the one end side and the other end side of the first coolant flow path 21*a* in the axial direction. The coolant CL circulating through the second coolant flow paths 21*b* and the first coolant flow paths 21*a* flows to the one end side and to the other end side in the axial direction in the slot 7, while exchanging heat with the rectangular conductors 8 and cooling heat generated due to copper loss, is discharged and dripped from the axially opposite ends of the slot 7, flows into the coolant reservoir 13 (see FIG. 1), and is collected as described above.

Figure 20:
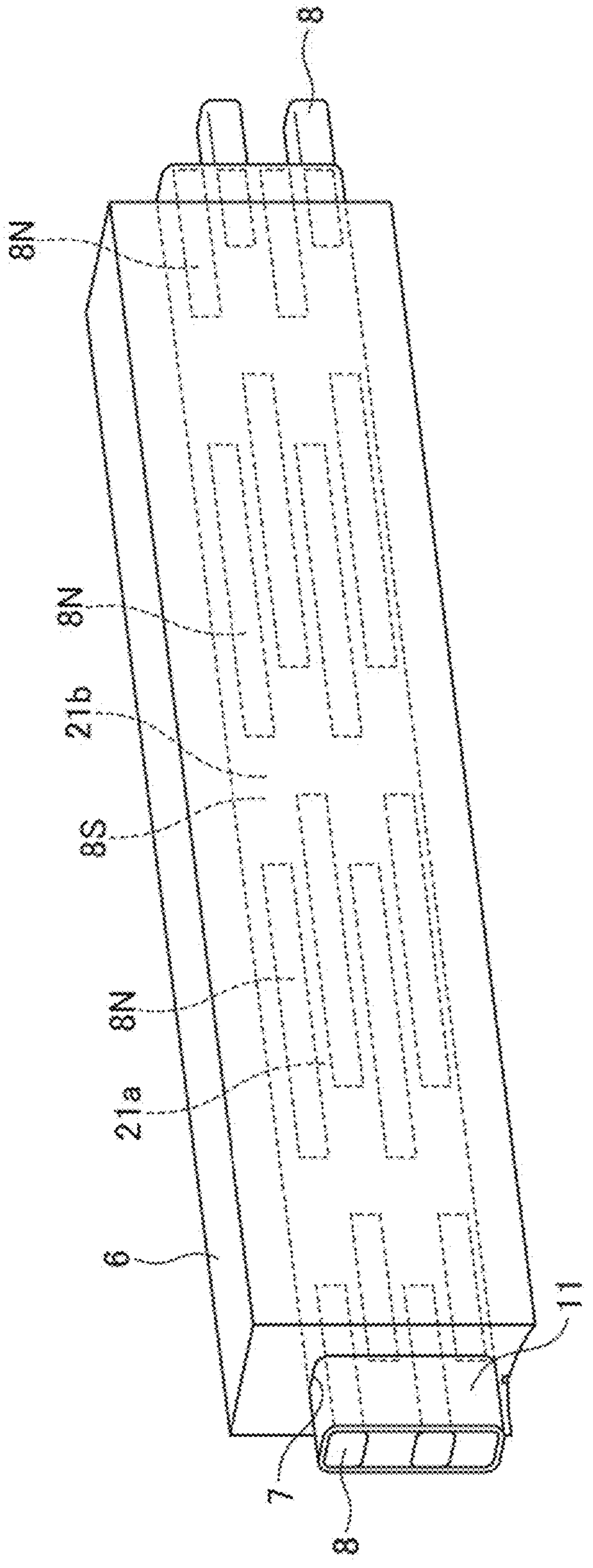
FIG. 20 is a transparent perspective view showing still another example of a configuration around the coolant flow paths shown in FIGS. 5 to 7.
Figure 21:
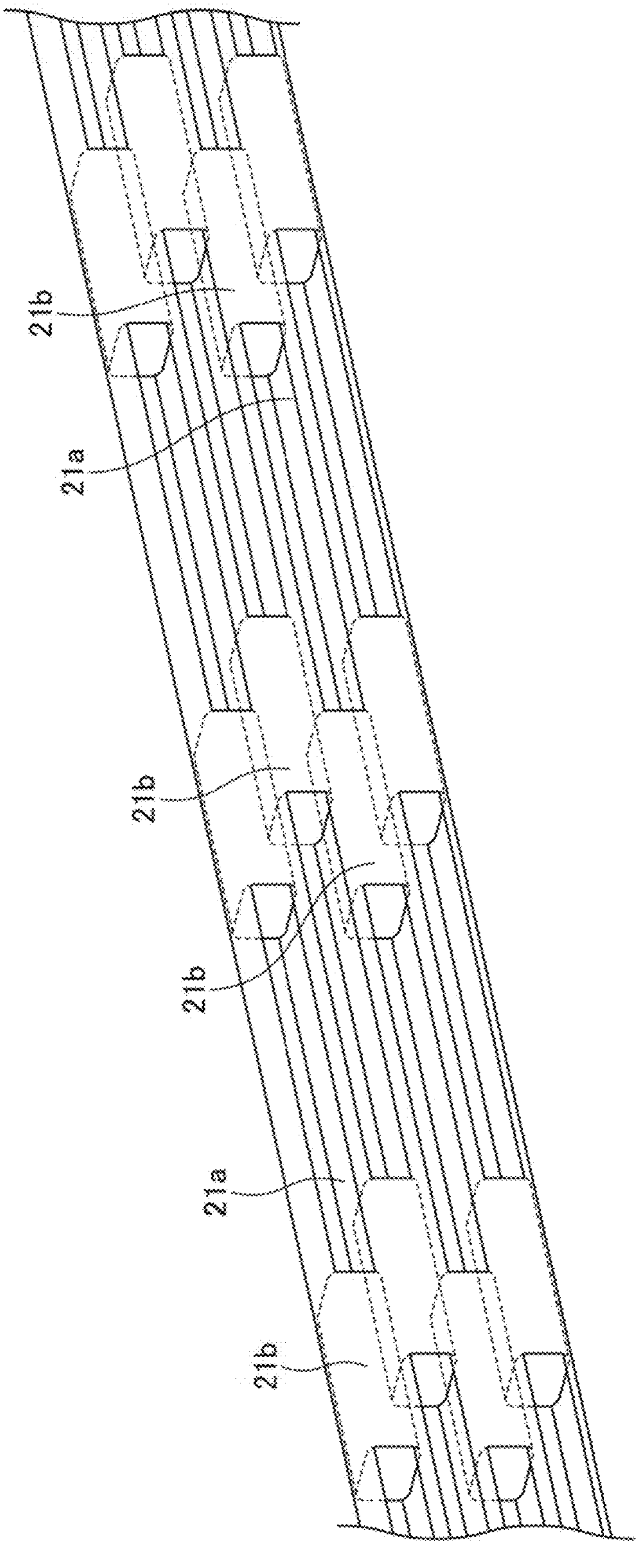
FIG. 21 is a conceptual diagram showing an extracted portion of the coolant flow paths in FIG. 20.

Next, with reference to FIGS. 20 and 21, an overview of still another aspect of the flow path for the coolant CL in one slot 7 in the rotating electrical machine 1 according to the present disclosure is provided. FIG. 20 is a transparent perspective view showing still another example of the configuration around the coolant flow paths shown in FIGS. 5 to 7. FIG. 21 is a conceptual diagram showing an extracted portion of the coolant flow paths in FIG. 20. As described in the overview provided with reference to FIG. 1, the coolant CL is supplied from the outside to the axially intermediate position of the stator core 6 of the rotating electrical machine 1.

The supplied coolant CL flows toward the inside in the radial direction through the second coolant flow paths 21*b* formed at three axially intermediate sites in the slot 7 as gaps between the inner wall of the slot 7 and the specific shape portions 8S of the rectangular conductors 8 stacked in the radial direction in the slot 7. In detail, each second coolant flow path 21*b* is formed as a gap between the insulating paper as the insulating member 11 in tight contact with the inner wall of the slot 7 and the outer surface of each rectangular conductor 8.

In the example shown in FIGS. 20 and 21, an aspect is adopted in which the phase positions of the specific shape portions 8S of the rectangular conductors 8 vary alternately in the axial direction, i.e., in a zigzag pattern, in a radially inward direction from the rectangular conductor 8 at the outermost periphery toward the rectangular conductor 8 at the innermost periphery. Accordingly, in the slot 7, each second coolant flow path 21*b* extending from the outer periphery side to the inner periphery side is in the zigzag pattern in accordance with the axial deviation in phase of the specific shape portions 8S described above. The above-described second coolant flow paths 21*b* are provided to form the zigzag pattern toward the inner periphery from the three sites, which include the axial center position at the outermost periphery of the slot 7 and the two positions away from the axial center position toward the one end side and the other end side in the axial direction.

The coolant CL flowing from the second coolant flow path 21*b* passes through the first coolant flow path 21*a* that communicates with the second coolant flow path 21*b*. Each first coolant flow path 21*a* is formed along the longitudinal direction of the rectangular conductors 8 as the gap between the normal shape portions 8N of the rectangular conductor 8. The coolant CL flowing from the second coolant flow path 21*b* into the first coolant flow path 21*a* passes through the first coolant flow path 21*a* in the axial direction of the rotating electrical machine 1.

The coolant CL bifurcates from the second coolant flow path 21*b* at the axial center position so as to flow toward the one end side and the other end side of the first coolant flow path 21*a* in the axial direction. The coolant CL circulating through the second coolant flow paths 21*b* and the first coolant flow paths 21*a* flows to the one end side and to the other end side in the axial direction in the slot 7, while exchanging heat with the rectangular conductors 8 and cooling heat generated due to copper loss, is discharged and dripped from the axially opposite ends of the slot 7, flows into the coolant reservoir 13 (see FIG. 1), and is collected as described above.

The rotating electrical machine 1 according to the present disclosure described above can be summarized as follows.

(1) A rotating electrical machine 1 of the present disclosure includes: a stator core 6 including a plurality of rectangular conductors 8 arranged in a slot 7; a first coolant flow path 21*a*; and a second coolant flow path 21*b*. Each rectangular conductor 8 includes a specific shape portion 8S and normal shape portions 8N that different from the specific shape portion 8S and arranged with the specific shape portion 8S interposed therebetween, and the specific shape portion 8S has a relatively small thickness dimension in one direction CW orthogonal to a longitudinal direction of the rectangular conductor 8, and a relatively large thickness dimension in another direction EW orthogonal to the longitudinal direction. The plurality of rectangular conductors 8 are juxtaposed in the slot 7 so that a plurality of the specific shape portions 8S are adjacent to each other, the first coolant flow path 21*a* is formed between the normal shape portions 8N of the plurality of rectangular conductors 8, and the second coolant flow path 21*b* is formed between an inner wall of the slot 7 and the specific shape portions 8S of the plurality of rectangular conductors 8.

In the rotating electrical machine 1 of (1) above, the rectangular conductors 8 are juxtaposed in the slot so that the specific shape portions 8S are adjacent to each other, whereby the first coolant flow path 21*a* is formed between the normal shape portions 8N of the rectangular conductors 8, and the second coolant flow path 21*b* is formed between the inner wall of the slots 7 and the specific shape portions 8S of the rectangular conductors 8. Due to this feature, for example, even if insulating paper disposed between the inner wall of the slot 7 and the straight parts of the rectangular conductors 8 contains a foamed material, the first coolant flow paths 21*a* are each ensured between the rectangular conductors 8 adjacent to each other when the rectangular conductors 8 are arranged in the slot 7, and communicate with the second coolant flow paths 21*b*, which are endured between the inner wall of the slot (including an insulating member 11, such as insulating paper) and the corresponding rectangular conductors 8. The coolant CL circulating through the foregoing coolant flow paths can efficiently cool the rectangular conductors 8 while the rotating electrical machine 1 is in operation.

(2) In the rotating electrical machine 1 according to one aspect of the present disclosure, the first coolant flow paths 21*a* are each formed between the normal shape portions 8N due to arrangement in which the specific shape portions 8S are stacked adjacent to each other in the slot 7 such that portions belonging to the specific shape portions 8S and each having the relatively large thickness dimension (EW) are aligned with each other in a stacking direction.

In the rotating electrical machine 1 according to the aspect (2) above of the present disclosure, the first coolant flow paths 21*a* are coolant flow paths each formed between the normal shape portions 8N due to arrangement in which the specific shape portions 8S are stacked adjacent to each other in the slot 7 such that portions belonging to the specific shape portions 8S and each having the relatively large thickness dimension (EW) are aligned with each other in a stacking direction. Due to this feature, the coolant flow paths as the first coolant flow paths 21*a* are ensured between the normal shape portions 8N of the rectangular conductors 8. The coolant CL circulating through the coolant flow paths facilitates cooling of the rectangular conductors 8.

(3) In the rotating electrical machine 1 according to one aspect of the present disclosure, the second coolant flow paths 21*b* are formed between the inner wall of the slot 7 and the specific shape portions 8S due to arrangement in which the specific shape portions 8S are stacked adjacent to each other in the slot 7 such that portions belonging to the specific shape portions 8S and each having the relatively small thickness dimension (CW) are aligned in a stacking direction.

In the rotating electrical machine 1 according to the aspect (3) above, the second coolant flow paths 21*b* are coolant flow paths formed between the inner wall of the slot and the specific shape portions 8S due to arrangement in which the specific shape portions 8S are stacked adjacent to each other in the slot 7 such that portions belonging to the specific shape portions 8S and each having the relatively small thickness dimension (CW) are aligned in a stacking direction. Due to this feature, the coolant flow paths as the second coolant flow paths 21*b* are ensured between the inner wall of the slot and the specific shape portions 8S of the rectangular conductors 8. The coolant CL flowing through the second coolant flow paths 21*b* smoothly floes to the first coolant flow paths 21*a*, thereby facilitating cooling of the entire rectangular conductors 8.

It should be noted that the technical idea of the present disclosure is not limited to the aspects described above. The detailed configuration may be appropriately changed in a range of the technical idea of the present disclosure. For example, instead of the configuration in which each specific shape portion 8S of each rectangular conductor 8 has a rectangular parallelepiped shape, a configuration may be adopted in which a three-dimensional shape with the relatively large thickness dimension (EW) and a three-dimensional shape with the relatively small thickness dimension (CW) are separately ensured.

EXPLANATION OF REFERENCE NUMERALS

1 . . . Rotating electrical machine
2 . . . Rotor
3 . . . Stator
4 . . . Casing
5 . . . Rotating shaft
6 . . . Stator core
7 . . . Slot
8 . . . Rectangular conductor
8N . . . Normal shape portion
8S . . . Specific shape portion
9 . . . Stator coil
10 . . . Inner wall surface
11 . . . Insulating member
12 . . . Coolant flow path
13 . . . Coolant reservoir
14 . . . Filter
15 . . . Pump
16 . . . Heat exchanger
17 . . . External coolant flow path
18 . . . Coolant supply path
19 . . . Coolant supply port
20 . . . In-stator-core coolant flow path
21 . . . Coolant circular communication path
21*a* . . . First coolant flow path
21*b* . . . Second coolant flow path
22 . . . Front cover member
23 . . . Rear cover member

What is claimed is:

1. A rotating electrical machine comprising:
a stator core including a plurality of rectangular conductors arranged in a slot;
a first coolant flow path; and
a second coolant flow path,
wherein each rectangular conductor includes a specific shape portion and normal shape portions that are different from the specific shape portion and arranged with the specific shape portion interposed therebetween, and the specific shape portion has a relatively small thickness dimension in one direction orthogonal to a longitudinal direction of the rectangular conductor, and a relatively large thickness dimension in another direction orthogonal to the longitudinal direction,
wherein the plurality of rectangular conductors are juxtaposed in the slot so that a plurality of the specific shape portions are adjacent to each other, and the first coolant flow path is formed between the normal shape portions of the plurality of rectangular conductors, and
wherein the second coolant flow path is formed between an inner wall of the slot and the specific shape portions of the plurality of rectangular conductors.

2. The rotating electrical machine according to claim 1, wherein
the first coolant flow path is formed between the normal shape portions due to arrangement in which the specific shape portions are stacked adjacent to each other in the slot such that portions belonging to the specific shape portions and each having the relatively large thickness dimension are aligned with each other in a stacking direction.

3. The rotating electrical machine according to claim 1, wherein
the second coolant flow path is formed between the inner wall of the slot and the specific shape portions due to arrangement in which the specific shape portions are stacked adjacent to each other in the slot such that portions belonging to the specific shape portions and each having the relatively small thickness dimension are aligned in a stacking direction.

* * * * *